United States Patent [19]
Lorey

[11] Patent Number: 5,735,787
[45] Date of Patent: Apr. 7, 1998

[54] CENTRIFUGAL SEPARATOR WITH FLOW REGULATOR AND METHOD

[75] Inventor: Manfred Lorey, Langenselbold, Germany

[73] Assignee: Filtan Filter-Anlagenbau GmbH, Langenselbold, Germany

[21] Appl. No.: 769,427

[22] Filed: Dec. 19, 1996

Related U.S. Application Data

[62] Division of Ser. No. 371,081, Jan. 9, 1995, Pat. No. 5,599,270.

[30]     Foreign Application Priority Data

Jan. 11, 1994 [DE] Germany ................... 4400489.3

[51] Int. Cl.⁶ ................................................. B04B 11/00
[52] U.S. Cl. ............................................ 494/5; 137/2
[58] Field of Search ................. 494/5, 6, 10, 23, 494/27, 29, 30, 36; 137/599, 601, 2; 55/459; 210/512.3, 304, 512.1, 512.2

[56]                    References Cited

U.S. PATENT DOCUMENTS

| | | | |
|---|---|---|---|
| 1,890,070 | 12/1932 | Whiton, Jr. ............... | 210/512.2 |
| 2,593,251 | 4/1952 | Bonacci et al. ............. | 96/55 |
| 2,848,060 | 8/1958 | McBride et al. ............ | 55/325 |
| 3,010,316 | 11/1961 | Snyder ........................ | 137/599 |
| 3,028,449 | 6/1962 | Murphy, Jr. et al. ....... | 137/599 |
| 3,541,593 | 11/1970 | Weston ....................... | 209/211 |
| 3,630,431 | 12/1971 | Oka ............................. | 494/30 |
| 3,884,660 | 5/1975 | Perry, Jr. et al. ........... | 55/396 |
| 3,938,734 | 2/1976 | Wilke ......................... | 494/30 |
| 4,151,083 | 4/1979 | Dove .......................... | 210/512.2 |
| 4,378,290 | 3/1983 | Kennedy, Jr. .............. | 210/512.3 |
| 4,458,494 | 7/1984 | Fekete ........................ | 210/512.3 |
| 4,622,150 | 11/1986 | Carroll ....................... | 210/512.3 |
| 4,670,410 | 6/1987 | Bailie ......................... | 55/459.1 |
| 5,165,236 | 11/1992 | Nieminen ................... | 60/39.464 |
| 5,182,008 | 1/1993 | Shelstad ..................... | 494/36 |

FOREIGN PATENT DOCUMENTS

| | | |
|---|---|---|
| 2588779 | 5/1987 | France . |
| 543335 | 2/1932 | Germany . |
| 2203036 | 8/1972 | Germany . |
| 3416181 | 12/1985 | Germany . |
| 276815 | 3/1990 | Germany . |

*Primary Examiner*—Tony G. Soohoo
*Attorney, Agent, or Firm*—H. Gibner Lehmann; K. Gibner Lehmann

[57]                    ABSTRACT

Apparatus and method for cleansing fluids which are contaminated with filterable and/or centrifugally separable particles, embraces a centrifugal separator having a plurality of inlets for the admission of fluids to be cleansed, and a plurality of valves connected respectively with the inlets. Solely one valve is continuously variable to control the rate of flow through it between given parameters. All of the other valves have solely either fully open or else fully closed positions. A particle filter precedes the valves, being connected thereto by branch pipes. The discharge from the centrifugal separator is monitored for quantity, and all of the valves can be automatically electronically shut off when a predetermined quantity of cleansed fluid has been obtained.

2 Claims, 1 Drawing Sheet

CENTRIFUGAL SEPARATOR WITH FLOW REGULATOR AND METHOD

This application is a division of application Ser. No. 08/371,081, filed Jan. 9, 1995, now U.S. Pat. No. 5,599,270.

CROSS REFERENCES TO RELATED APPLICATIONS

The present application claims priority under 35 USC 119, of German Application No. P 44 00 489.3 filed Jan. 11, 1994.

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to centrifugal separators for the separation of particles or drops of a denser material from a liquid or gaseous carrier medium to be cleansed, especially for the separation of liquid drops from a gas, particularly air or natural gas.

More particularly the invention involves a separator device wherein a stream of the medium to be cleansed is introduced through at least one entrance aperture of the device, such device including means which is provided for the purpose of regulating the volume of the introduced stream.

The invention relates further, in a general sense, to a device for the separation of particles or drops of a denser material from a gas to be cleansed, and in more detail for the separation of dust as well as liquid drops of water and/or oil from compressed air or natural gas, with a solids filter interposed in the feed pipeline and with a centrifugal separator disposed downstream from the solids filter, for the separation of the liquid drops.

Finally, the invention relates to a method for setting the volume of the stream flowing through the centrifugal separator.

2. Description of the Related Art Including Information Disclosed Under 37 CFR §§1.97–1.99

In many areas of technology it is necessary to clean a medium flowing through a pipeline, of various components of a contaminating medium. The medium to be cleaned can be liquid, but in the majority of applications it is gaseous. The invention is particularly well suited for devices in which a gaseous medium is to be cleaned, but it is not restricted to such devices. An example of the technical area in which the invention can be realized especially concerns the purification of a gas in pressure regulating stations whence the gas is fed into a distribution network. This includes, for example, pressure regulating stations in natural gas supply locations or compressed-air ductwork systems, where natural gas or compressed air is to be cleaned of dust and liquid components such as condensed water or oil.

According to the state of the art, there is provided in such stations, first of all, a solids filter in which are arranged e.g. candle-shaped filters by means of which the solid particles are removed from the gas passing through. The liquid vapors contained in the gas which condense out due to the pressure drop occurring above the filter, cannot be removed by the solids filter, however. Therefore, according to the state of the art, a centrifugal separator Is provided downstream of the solids filter, which causes the gas to move essentially in a circular or spiral path that produces a sink. The sink represents a centrifugal field of force in which the liquid droplets which enter it together with the gas flow, also have a circumferential speed that, in a centrifugal separator of spiral construction, increases from the outside to the inside in accordance with the rule of twist.

Co-rotating particles experience a centrifugal force and push other particles outwardly. The centrifugal force is proportional to the mass of the particle, to the square of the circumferential speed and inversely proportional to the radius of the momentary circular motion. Countering the centrifugal force are forces of resistance, for which reason there is a radius where the centrifugal force equals the force of resistance.

A particle of a certain size or of a determinate floating velocity will then circle continuously, whereas bigger particles will move outwardly and become separated. It follows from the foregoing that in order to separate liquid drops as small as possible, high circumferential speeds must occur, and the inner radius of the centrifugal separator must be as small as possible. Expressed differently, it is desirable when separating liquids from gases, that the liquid droplets be as large as possible.

Therefore, the maxim is that a centrifugal separator of large dimensions is inferior to one having small dimensions with respect to the limiting size, i.e. the smallest liquid drop still separated. In the past, therefore, multicyclones have already become known, which are composed of individual centrifugal separators of smaller size. But in particular, wherever large quantities of a gas are to be cleaned they have be put through centrifugal separators of larger size as a matter of preference—in particular because of the lower manufacturing costs. Such larger-sized centrifugal separators pose problems whenever the volume stream which is to be put through varies greatly in band width, i.e. whenever a shut-off valve and regulating member or valve ahead of the entrance aperture of the separator restricts the volume flow. Particularly in the applications mentioned, i.e. when purifying natural gas or compressed air at pressure regulating stations, there will occur a problem because the flow turbulences Caused by the shut-off valve result in the liquid droplets contained in the gas flow becoming atomized to the point where their diameter drops below the limit applicable to the centrifugal separator designed for maximum flow volume, meaning that such droplets will not be separated.

Besides the droplet size reduction of the liquid to be separated, as a consequence of atomization, it is a further disadvantage of the known arrangement, in which a shut-off member is disposed in a pipeline designed for maximum volume flow throughput, that the flow velocities in the pipeline are low in small throughputs, i.e. small volume flows. This also means that the entrance velocities of the gas flow into the centrifugal separator are slow as well, and, accordingly, the circumferential speeds in the sink generated in the centrifugal separator are correspondingly slow so that, in addition to the negative influence that the liquid drops to be separated by atomization have been reduced in size, the unfavorable circumstance is added that the centripetal acceleration acting upon the respective drops and proportionately governing the generation of a centrifugal force becomes smaller. This latter circumstance is intensified in particular by the fact that the centripetal acceleration depends quadratically on the circumferential speed.

It can be stated in summary that centrifugal separators in the above described applications are being built, for design reasons and to keep investment costs low, for maximum throughput, but that, in the arrangement with a preceding shut-off member in the supply line as known from the state of the art, they work unsatisfactorily when set to low volume flow of the medium to be purified.

In DD 27 68 15 A the dependence of the separation output on the material throughput in cyclones is referred to. The insertion of flaps or the like changing the entry impulse of the material flow is said to be disadvantageous because an unfavorable intervention in the flow conditions is said to be connected with it. It is suggested that the entire material flow led to a swirler be divided before the swirler by a first division into two or more partial flows, of which at least one is led via a valve for varying the partial flows, which variation may be into equal or unequal parts, for subsequent division of the partial flows again into two or more partial flows, and the partial flows being led into the swirler via a lead-in channel each. The stepwise division of the volume flow into more and more partial flows, however, also leads to disadvantageous turbulences. Since all valves in this arrangement are continuously adjustable, disadvantageous turbulences are also generated in the partial flows due to the narrowed flow sections.

SUMMARY OF THE INVENTION

Therefore, the invention is based on the task of eliminating this unfortunate condition by providing a centrifugal separator characterized by an improved separating output at small throughputs and further by a comparatively simple design. The invention is further based on the task of integrating the centrifugal separator to be invented into an overall system for the purification of a fluid flow and to indicate a method for its most economic operation.

In a centrifugal separator of this type, the invention is characterized in that a shut-off member or valve is coordinated with each inlet opening and in that the inlet openings can be opened or closed independently of each other, one valve being designed so that the cross section of an inlet opening can be increased or decreased in size continuously, and at least one other valve having only two positions, namely a fully shut-off position and a fully-open, flow-through position.

The term "shut-off members" is understood to mean all fixtures (pipeline switches or valves) which can be inserted into the pipeline leading to the respective inlet opening. It is also in the sense of the invention to include, under the general concept of the opening or closing of the inlet opening, the case in which the valves do not act directly upon the inlet opening or its cross section located in the container wall, but are located at a finite distance therefrom in the respective pipeline leading to the inlet opening.

The invention can be realized to advantage in connection with any form of valve known in the state of the art. This includes, for example, valves in which a shut-off body (plate, cone, piston, ball) releases, by a lift-off motion parallel to the flow direction, a cylindrical ring cross section as flow cross section. But this also includes, for example, slide valves whose shut-off element is moved transverse to the flow direction, as well as faucets or rotary slides, flaps and so forth.

The arrangement according to the invention accomplishes that, by completely closing, respectively, one inlet opening or the pipe section leading to it, the volume flow of the gas or the like to be purified is adjustable in discrete steps. For instance, if five pipelines are provided, the steps 1/5, 2/5, 3/5, 4/5 and 5/5 (i.e. 1/1) of the entire volume flow can be set. It is advantageous in this connection that the pipelines not blocked can make use of the entire flow cross section without a valve partially narrowing the flow cross section, which would lead to unfavorable flow paths, in particular to turbulent flow disruptions and to the disadvantageous consequences connected therewith and explained above. Furthermore, the flow velocities are so small also in the area behind the valves due to the flow cross sections adapted to the volume throughput, that high flow velocities and hence good separation effects in the centrifugal separator are attained.

If one assumes, as in the example discussed, that five single pipelines of equal cross section with corresponding inlet openings are provided in the centrifugal separator, a volume flow amounting to 0.7 times the maximum total volume flow can be set, for example, in that three of the lines equipped with simple open/closed valves are opened, corresponding to a volume flow of 3/5 of the maximally possible volume flow; and the fourth line is completely blocked by a simple open/closed valve. The fifth line, equipped with the continuously movable valve, is then set to 50%, i.e. to half the partial flow-through quantity, corresponding to 1/10 of the maximum total flow-through quantity. The total volume of gas to be purified and flowing through the lines then amounts to 0.7 times the total volume flow, but only 1/10 thereof is affected by the negative influences of the continuously movable valve introduced into the flow path. Accordingly, it is only in this partial area that the above described negative effects can occur, including in particular an atomization of the gas contained in the liquid portion.

In this connection it should be noted expressly that the above discussion on volume flows represents idealizations which apply fully to an incompressible medium only. Where compressible media are involved, such as natural gas or compressed air, there will be deviations from this idealization which, however, do not influence in any way the basic idea of the invention.

It further follows from the above that the invention is advantageously realized in a preferred embodiment in such a manner that exactly one valve is designed so as to be continuously adjustable between fully closed and fully opened positions, while the others are solely switchable, in a digital or binary sense, between an essentially fully shut-off position and an essentially completely open, flow-through position.

In addition, it is provided in a preferred embodiment of the invention that the valves can be controllable by a process guiding computer. It may be provided in particular that the process guiding computer, together with the valves provided according to the invention, form a control circuit so that the volume flow going through the entire arrangement can be controlled by a control entity such as a specified desired minimum pressure.

It goes without saying that, as an alternative, it may be provided that the individual valves are manually operable whereby manufacturing costs can be kept low in cases in which a greater band width of desired volume flow fluctuations is permissible.

In particular, it may also be provided according to the invention to combine the centrifugal separator with a preceding solids filter, it being particularly advantageous to provide that the pipeline carrying the medium to be purified is branched only downstream of the solids filter. In this way, manufacturing costs are further kept low because the solids filter reacts insensitively in varying flow-through velocities and the solid particles to be separated by it are insensitive to atomization effects. Downstream of the solids filter is provided a pipe branching, making possible an apportionment of the total volume flow to the pipelines leading to the various inlet openings of the centrifugal separator.

Beyond this, it may be provided in special cases that the inlet apertures of the centrifugal separator according to the invention have different inlet cross sections so that cases can be taken into account in which certain quantitatively partial volume flows form part of the more frequent operating states of the overall arrangement. This may be the case, for example, when a natural gas supply station supplies several consumers, one of which is disconnected more frequently. In such a case, one of the lines can be designed so that the partial volume flow going through it corresponds to that of the respective consumer to be disconnected. For instance, if this partial volume flow corresponds to a ⅓ of the total volume, a line or an inlet cross section may be provided which proportionately corresponds to ⅓ of the total volume flow, whereas the remaining—e.g. four—lines can be equally divided so that they transport ⅙ each of the total volume flow.

The invention should preferably be realized with a centrifugal separator in which the individual partial volume flows are introduced tangentially and the inlet cross sections are uniformly distributed over a circumference of the centrifugal separator. However, the invention is in no way restricted to this, but can also be applied to so-called axial cyclones. A centrifugal separator according to the invention can then be mounted either vertically or horizontally.

Other features and advantages will hereinafter appear.

BRIEF DESCRIPTION OF THE DRAWINGS

The invention is explained below in greater detail by way of the drawing. In the only FIGURE, the drawing shows a schematic view of a pressure control network intended for a natural gas supply station with an integrated centrifugal separator preceded by a solids dust filter.

DESCRIPTION OF THE PREFERRED EMBODIMENT

Figure 1:
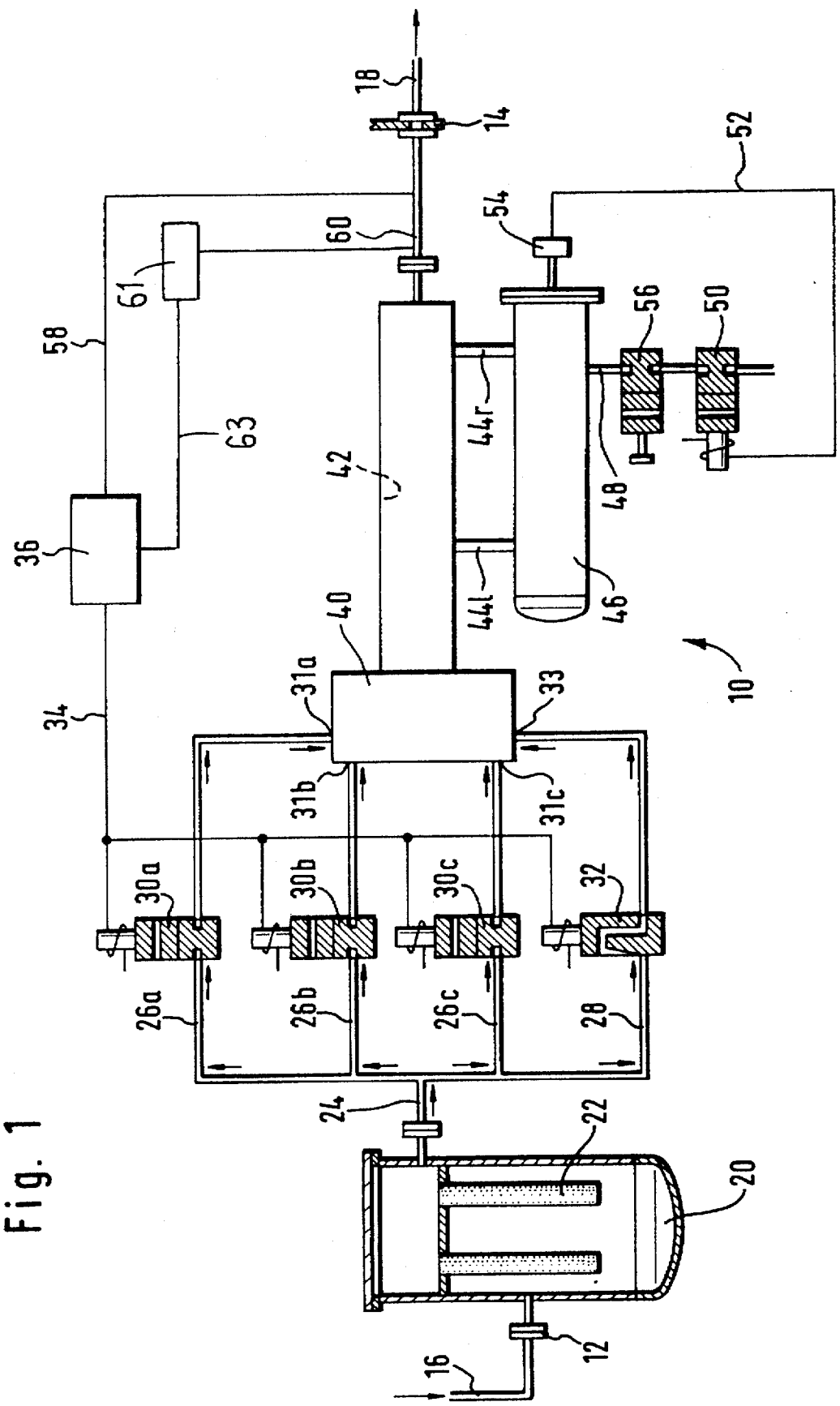

The entire system 10 is inserted between appropriate fittings 12 and 14 into a pipeline having an input section 16 and an output section 18. The natural gas to be purified flows first through a solids filter 20 in which the gas flowing through it is freed, by means of filter candles 22 provided in it, of dust particles carried thereby. After flowing through the solids filter 20, the entire volume flow is distributed to four branch pipelines 26a–c, 28 by means of a manifold 24. Disposed in the three branch lines 26a–c are three valves 30a–c which can be actuated e.g. electromagnetically and can be respectively switched back and forth only between two states, namely a fully open state and a fully-off or blocking state. In the pipeline 28, on the other hand, is disposed a valve 32 which is designed to be controllable or adjustable as to its extent of opening, over a continuous range, so that it is possible to ,set a volume flow in the pipeline 28 which corresponds to any value between zero and ¼ of the maximum total volume flow going through the incoming line 16.

The three valves 30a–c and the fully adjustable valve 32 are connected to a guidance computer or microprocessor 36 via a signal line 34.

The partial volume flows going through the partial lines 26a–c and 28 flow through inlet apertures 31a–c, 33 into the centrifugal separator 40. The representation in the FIGURE is meant to be schematic so that it is provided, for instance, in a centrifugal separator equipped with tangential inlet openings that the inlet openings 31a–c, 33 are distributed uniformly over the centrifugal separator's circumference. The fluid particles that are flung outwardly on account of the centrifugal forces collect on the wall 42 of the centrifugal separator and are carried into a fluid collection tank 46 through pipes 44 l, 44 r. The fluid collection tank 46 can be emptied through a drain line 48 which is closed by an automatically controlled valve 50. The valve 50 is actuated via a line 52 connected to a liquid level indicator 54. There also may be provided with the valve 50 a manually operated valve 56, by means of which the line can be shut off for maintenance purposes or the like.

The guidance computer or microprocessor 36 is connected to a pipe section 60 located downstream of the centrifugal separator 40 via a data gathering line 58. Connected to the pipe section may be a pressure recorder 61, for example, which is connected to the microprocessor 36 via a signal line 63. Depending on a specified desired value, the microprocessor 36 determines signals by means of which the shut-off members or valves 30a–c are addressed so that they are either fully opened or closed, whereas the continuously working valve 32 is addressed so that the desired total volume flow results. Therefore, a closed control circuit results via the microprocessor 36, through which the total volume or flow through the centrifugal separator can be regulated without the disadvantageous effects mentioned above and occurring in a pipeline designed for the maximum total volume flow taking place.

From the above it can be seen that I have provided a novel and improved centrifugal separator and controller therefor, which is simple in its structure, and which provides significantly improved results over those obtainable with prior known systems.

The practice of the invention, as well as the method thereof, are carried out with relatively simple components that are readily available commercially, for the most part.

The device and method are thus seen to constitute a distinct advance and improvement in the field of liquid media purification.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. The method of cleansing a finite quantity of a contaminated fluid, which consists of the steps of admitting the fluid into the chamber of a centrifugal separator through a plurality of inlet openings, independently controlling the flow of fluid through one of said inlet openings to enable solely a full flow or else a complete shut-off of the flow to be established through said inlet opening while simultaneously setting the rate of flow of fluid through another one of said inlet openings to a value between two given parameters.

2. The method of claim 1, and including the further step of monitoring the discharge from the centrifugal separator and shutting off all of the said valves when a predetermined quantity of fluid discharge has occurred from the separator.

* * * * *